(12) United States Patent
Shaw

(10) Patent No.: US 6,382,646 B1
(45) Date of Patent: May 7, 2002

(54) KICK SCOOTER STEERING CONTROL MECHANISM

(76) Inventor: Athony Shaw, 21F-3, No. 218, Feng Chia Road, Taichung (TW)

( * ) Notice: Subject to any disclaimer, the term of this patent is extended or adjusted under 35 U.S.C. 154(b) by 0 days.

(21) Appl. No.: 09/767,697

(22) Filed: Jan. 24, 2001

(51) Int. Cl.[7] .............................................. A63C 17/02
(52) U.S. Cl. ............................ 280/87.041; 280/87.042; 280/11.28
(58) Field of Search ........................ 280/11.28, 87.01, 280/87.041, 87.042, 87.043, 87.05, 266, 267, 263, 14.27, 14.28, 124.111, 124.179

(56) References Cited

U.S. PATENT DOCUMENTS

| | | | | |
|---|---|---|---|---|
| 2,032,657 A | * | 3/1936 | Frederickson | 280/111 |
| 2,531,933 A | * | 11/1950 | Clark | 267/60 |
| 2,791,440 A | * | 5/1957 | Guidobaldi | 280/87.041 |
| 4,054,297 A | * | 10/1977 | Solimine | 280/87.042 |
| 4,403,784 A | * | 9/1983 | Gray | 280/11.28 |
| 4,550,926 A | * | 11/1985 | MacIsaac | 280/112.2 |
| 4,775,162 A | * | 10/1988 | Chao | 280/87.041 |
| 4,951,958 A | * | 8/1990 | Chao | 280/87.041 |
| 5,048,632 A | * | 9/1991 | Battel | 180/181 |
| 5,263,725 A | * | 11/1993 | Gesmer et al. | 280/11.28 |
| 5,330,214 A | * | 7/1994 | Brooks et al. | 280/87.042 |
| 5,762,351 A | * | 6/1998 | SooHoo | 280/267 |
| 5,924,710 A | * | 7/1999 | Milne | 280/87.042 |
| 5,950,754 A | * | 9/1999 | Ondrish, Jr. | 180/181 |
| 5,997,018 A | * | 12/1999 | Lee | 280/87.042 |
| 6,170,242 B1 | * | 1/2001 | Gordon | 56/15.8 |
| 6,206,388 B1 | * | 3/2001 | Ouboter | 280/87.042 |
| 6,224,076 B1 | * | 5/2001 | Kent | 280/87.042 |
| D445,145 S | * | 7/2001 | Yang | D21/423 |
| 6,279,930 B1 | * | 8/2001 | Chang et al. | 280/87.042 |
| 6,286,843 B1 | * | 9/2001 | Lin | 280/11.28 |
| 6,299,186 B1 | * | 10/2001 | Kao et al. | 280/87.041 |

* cited by examiner

*Primary Examiner*—Brian L. Johnson
*Assistant Examiner*—Bridget Avery
(74) *Attorney, Agent, or Firm*—Browdy and Neimark

(57) ABSTRACT

A kick scooter steering control mechanism includes a five-bar linkage formed of a bracket, two toggle members and two follower levers to achieve a three-dimensional linking effect for enabling the front wheels of the kick scooter to be turned smoothly to change the steering direction.

6 Claims, 7 Drawing Sheets

KICK SCOOTER STEERING CONTROL MECHANISM

BACKGROUND OF THE INVENTION

The present invention relates to kick scooters and, more specifically, to a steering control mechanism for kick scooter.

FIGS. 1 and 2 show a handlebar-controlled kick scooter according to the prior art. This structure of kick scooter comprises a footplate 1, a bracket 2 fixedly provided at the front side of the footplate 1, a rear wheel 3 pivoted to the rear side of the footplate 1, and a steering control column 4 fixedly provided at the top side of the bracket 2, two actuating members 5 bilaterally pivoted to the bottom side of the bracket 2 and respectively fixedly connected to the wheel axles of the front wheels 6, a link coupled between the actuating members 5, a spacer 7 mounted on the link, and two spring members 8 respectively mounted on the link and stopped between two opposite sides of the spacer 7 and the actuating members 5. When changing the steering direction of the front wheels 6, the actuating members 5 are turned in one direction to compress one spring member 8 and stretch the other spring member 8. The spring members 8 prevent an overturn, and automatically force the front wheels 6 back to the center position after the turning force has been released from the front wheels 6. The bracket 2, the actuating members 5 and the link form a four-bar linkage to achieve a two-dimensional swinging movement about the pivoted point between each actuating member 5 and the bracket 2. According to this structure of kick scooter, the front wheels 6 receive a component of force in the turning direction and a downward pressure from the rider through the bracket 2 and the actuating members 5, and the downward pressure interferes with the transmission of the turning force to the front wheels 6. In order to overcome the downward pressure when changing the steering direction of the front wheels 6, the rider must employ much effort to the front wheels 6.

SUMMARY OF THE INVENTION

The present invention has been accomplished to provide steering control mechanism for kick scooter, which eliminates the aforesaid problem. It is the main object of the present invention to provide a kick scooter steering control mechanism, which enables the rider to control the steering of the kick scooter smoothly with less effort. It is another object of the present invention to provide a kick scooter steering control mechanism, which provides a five-bar linkage to achieve a three-dimensional linking effect for enabling the front wheels of the kick scooter to be turned with less effort to change the steering direction of the kick scooter smoothly. According to the present invention, the kick scooter steering control mechanism is installed in the footplate of a kick scooter having two front wheels and adapted to control the steering of the kick scooter, comprising: a bracket fixedly provided at the front side of the footplate of the kick scooter, the bracket comprising a top beam and a bottom beam; two toggle members respectively fastened to the front wheels of the kick scooter and pivoted to the bracket and disposed at two sides between the top beam and the bottom beam, the toggle members each comprising an arm, which is moved horizontally when the front wheels are turned through an angle; a spring members respectively coupled between the toggle members and the top beam of the bracket to impart a downward pressure to the toggle members; two follower levers respectively coupled between the arms of the toggle members and the footplate of the kick scooter and turned vertically upon horizontal movement of the arms of the toggle members, the follower levers each having a first end coupled to the footplate of the kick scooter and a second end coupled to the arm of one of the toggle members.

DETAILED DESCRIPTION OF THE PREFERRED EMBODIMENT

Figure 1:
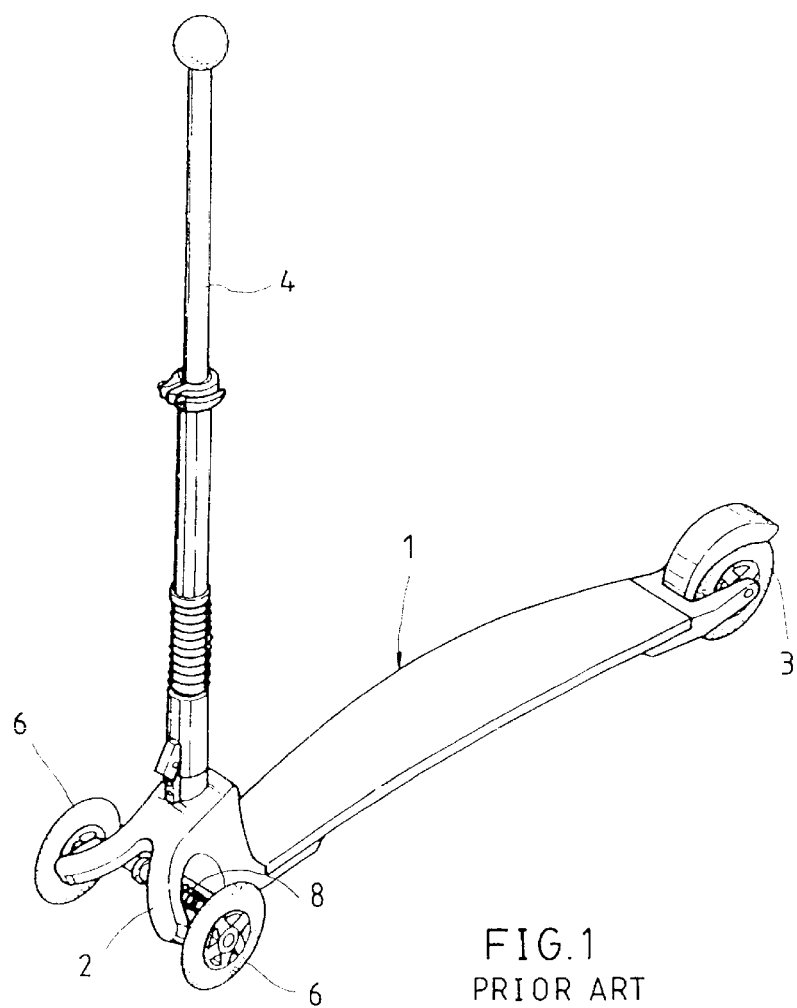
FIG. 1 is an elevational view of a kick scooter according to the prior art.
Figure 2:
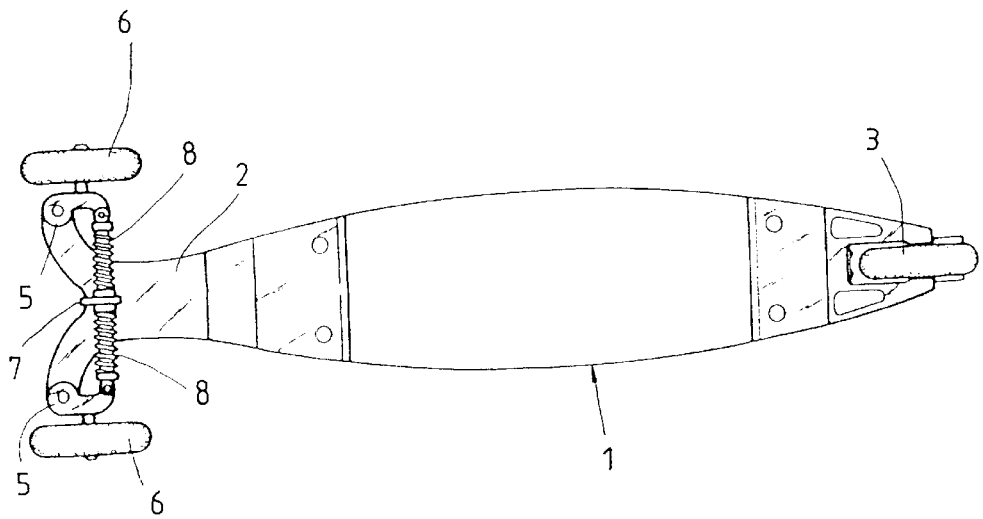
FIG. 2 is a bottom view of the kick scooter shown in FIG. 1.

Referring to FIGS. From 3 through 6, a kick scooter steering control mechanism in accordance with the present invention is shown provided at the front side of the kick scooter's footplate 100 for steering control. The footplate 100 comprises two spherical connectors 101 at its front side. The steering control mechanism is comprised of a bracket 10, two guide rods 20, two toggle members 30, two axle caps 40, two spring members 50, and two follower levers 60.

The bracket 10 is a substantially I-shaped frame comprising a top beam 11 and a bottom beam 12. The middle part of the bracket 10 is fixedly fastened to the front side of the footplate 100 by a fastening element, for example, a screw bolt 13. The top beam 11 and the bottom beam 12 each have two through holes 111 or 121 at two ends. The guide rods 20 are respectively fixedly connected between the through holes 111 of the top beam 11 and the through holes 121 of the bottom beam 12, each having an upper part of polygonal cross section 21 and a lower part of circular cross section 22. The toggle members 30 each comprise a circular axial hole 31 coupled to the lower part 22 of one guide rod 20, a first arm 32 and a second arm 33 arranged at right angles, and two protruded portions 35 and 36 disposed at the top sidewall thereof. The first arm 32 of each toggle member 30 is respectively fixedly connected to the wheel axle of each front wheel 200. The second arm 33 of each toggle member 30 has one end terminating in a spherical connector 34. When turning the front wheels 200, the second arms 33 are moved horizontally. The axle caps 40 each comprise an axial hole 41 of polygonal cross section fitting and coupled to the polygonal upper part 21 of one guide rod 20, and an uneven bottom edge fitting over the raised portions 35 and 36 of the top sidewall of one toggle member 30. When the toggle members 30 are turned with the front wheels 200, the raised portions 35 and 36 of the toggle members 30 push the axle caps 40 upwards. Because the polygonal axial hole 41 of each axle cap 40 is respectively coupled to the polygonal upper part 21 of each guide rod 20, the axle caps 40 are prohibited from a rotary motion relative to the guide rods 20 and forced to move upwards along the guide rods 20 when receive pressure from the raised portions 35 and 36 of the toggle members 30. The spring members 50 are, for example, compression springs respectively sleeved onto the upper part of polygonal cross section 21 of each guide rod 20 and stopped between the top beam 11 and the axle caps 40. When the axle caps 40 are moved upwards, the compression springs 50 are compressed. When the axle caps 40 are released from the pressure of the toggle members 30 (the front wheels 200), the compression springs 50 immediately push the axle caps 40 downwards to force the toggle members 30 back to their former position, thereby causing the front wheels 200 to be returned to the center position. The two follower levers 60 each comprises a first ball socket 61 horizontally facing the footplate 100 and coupled to one spherical connector 101 of the footplate 100, a second ball socket 62 facing vertically downwards and coupled to the spherical connector 34 of one toggle member 30, and two jackets 63 respectively covered on ball sockets 62 to secure the ball sockets 62 to the respective spherical connectors 101 and 34.

Figure 3:
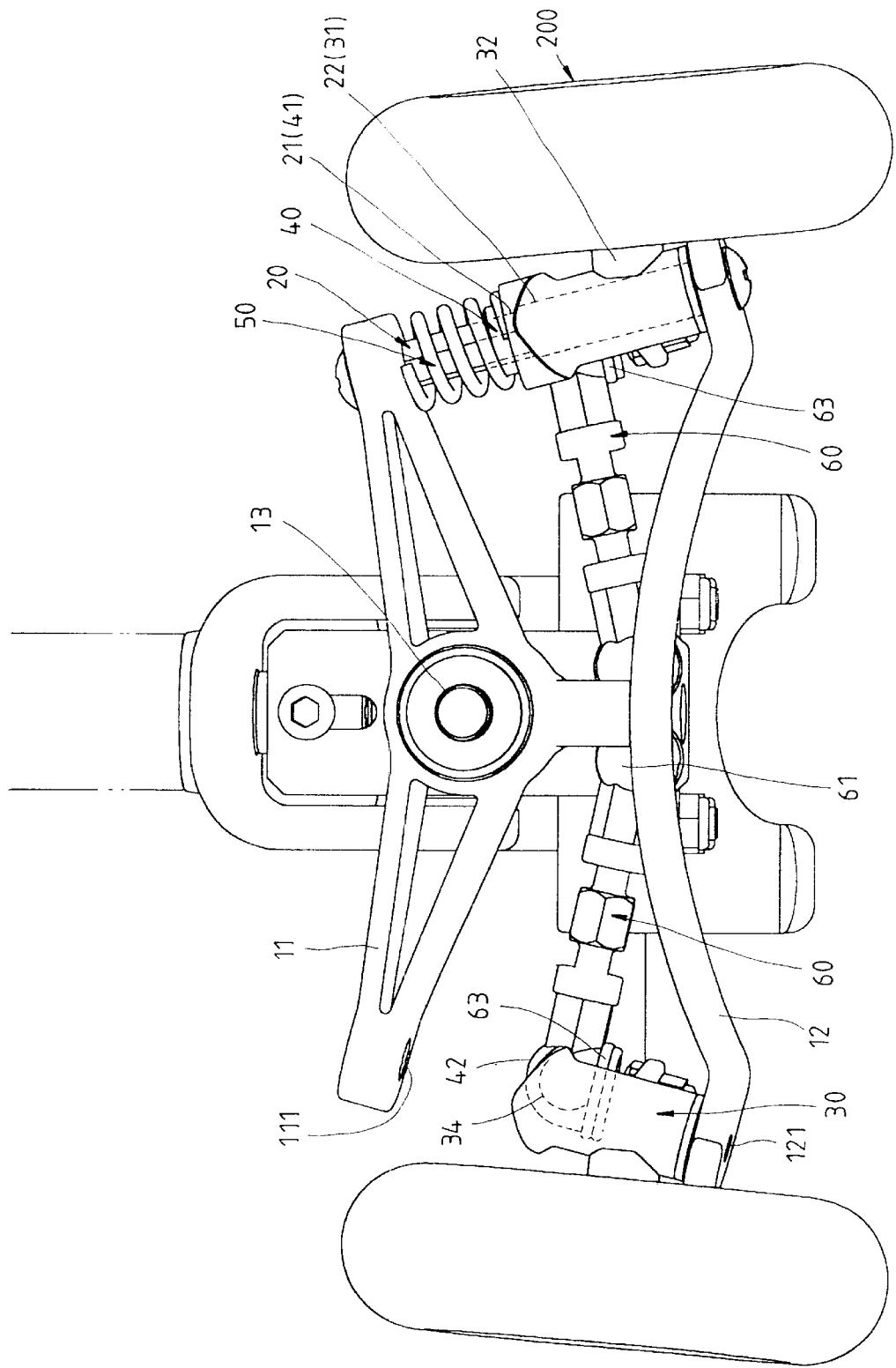
FIG. 3 is a front view and partially in section of the kick scooter steering control mechanism according to the present invention.
Figure 4:
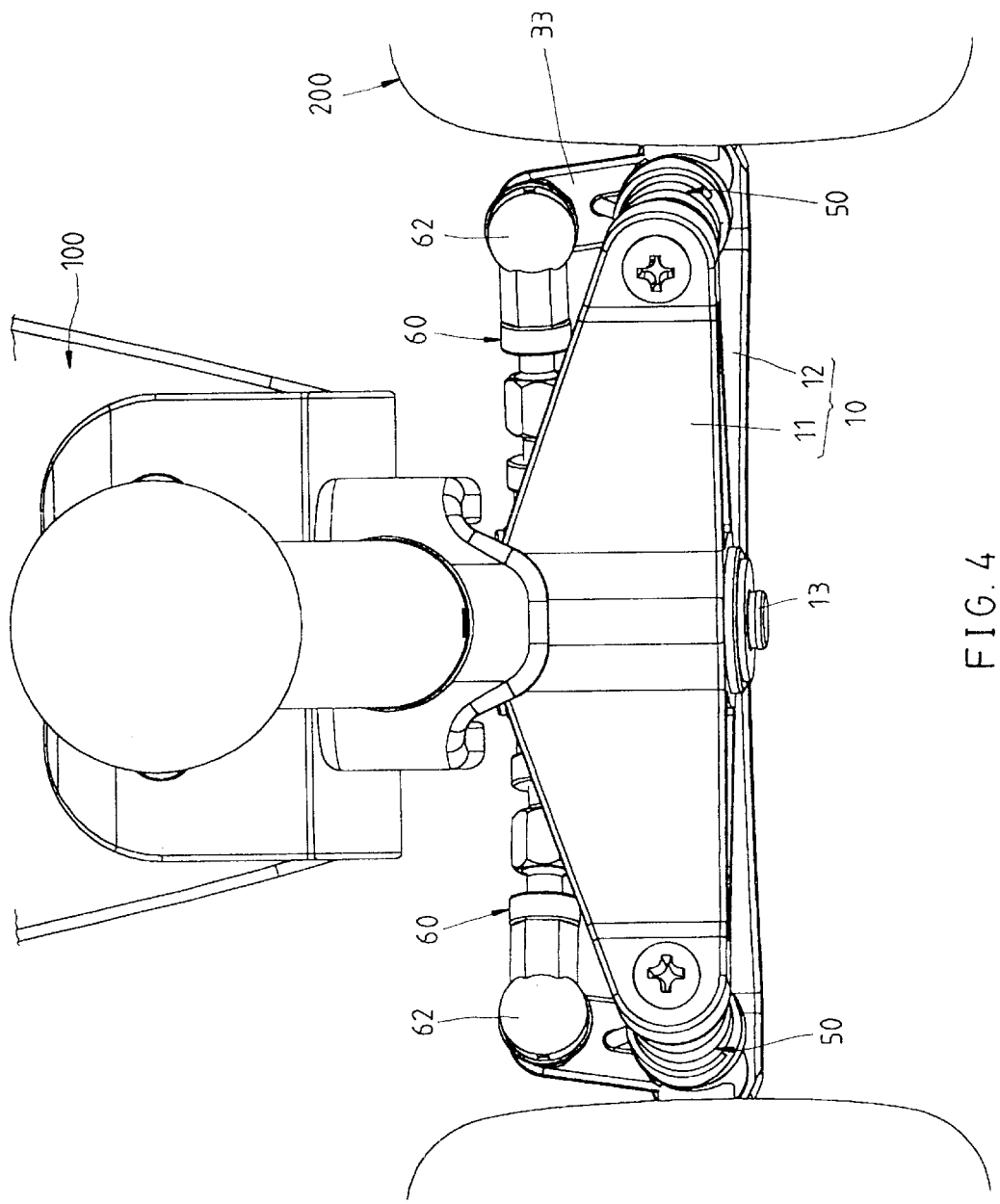
FIG. 4 is a top view of the kick scooter steering control mechanism according to the present invention.
Figure 5:
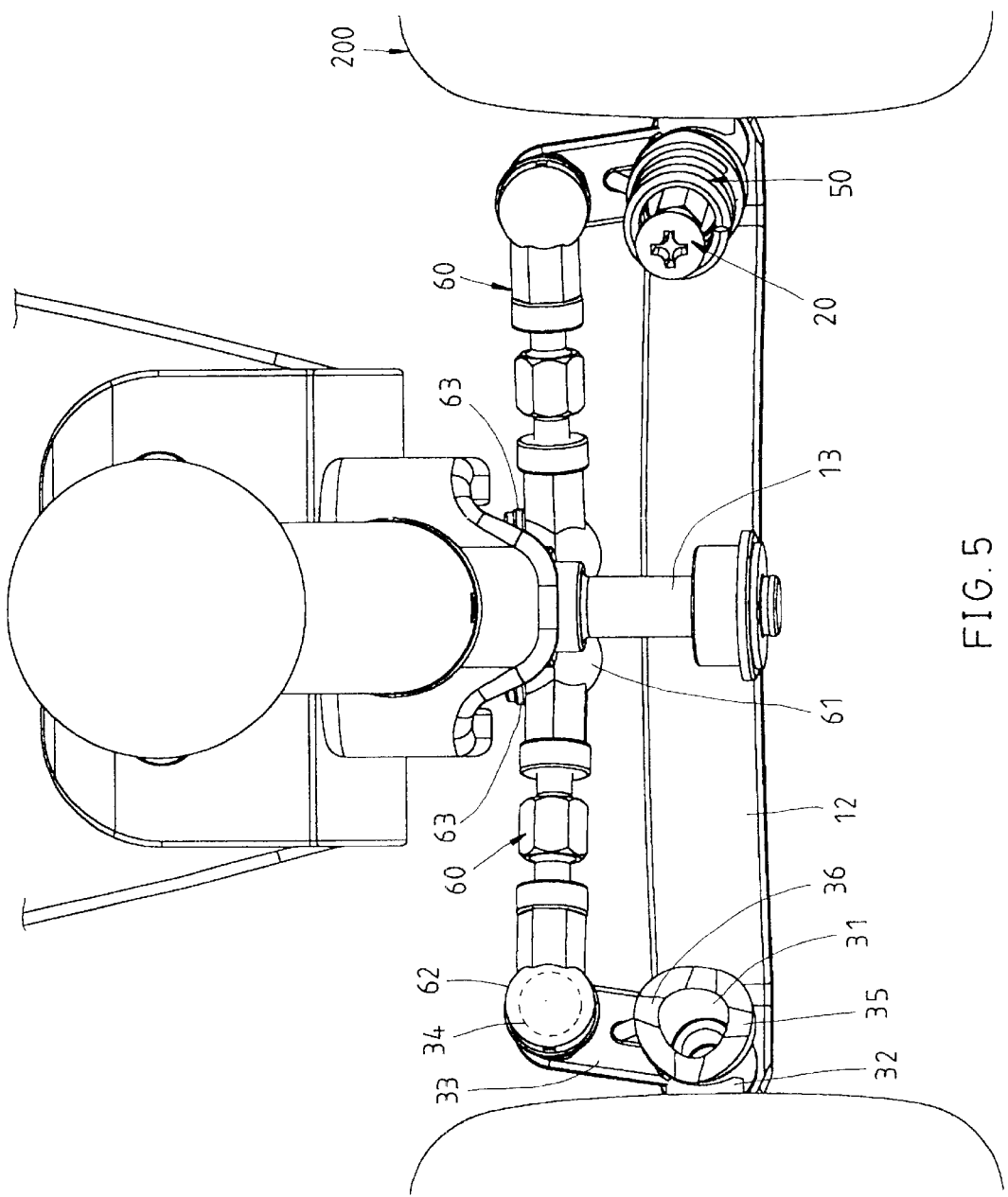
FIG. 5 is a top view, partially in section, of the kick scooter steering control mechanism according to the present invention.
Figure 6:
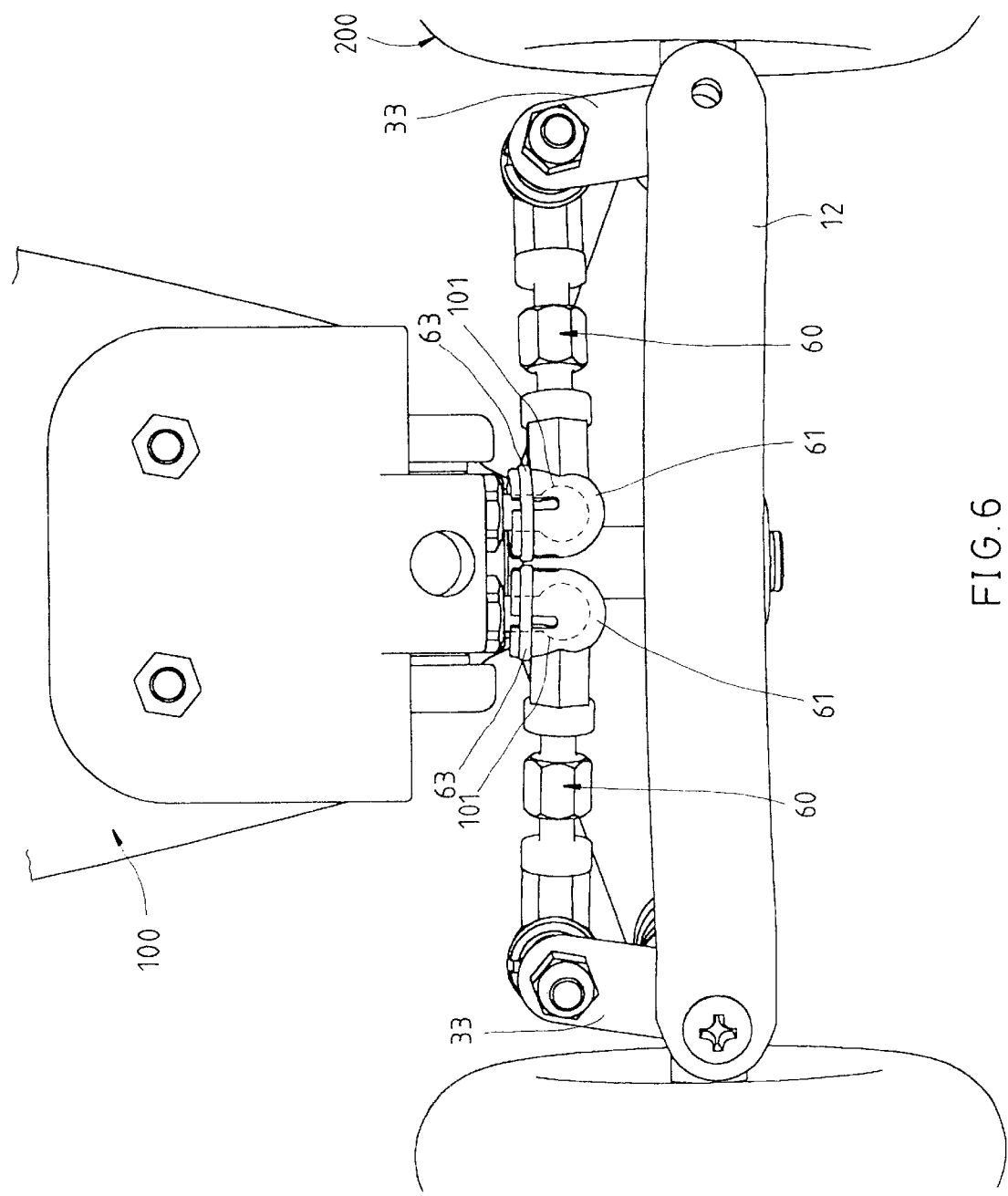
FIG. 6 is a bottom view of the kick scooter steering control mechanism according to the present invention.
Figure 7:
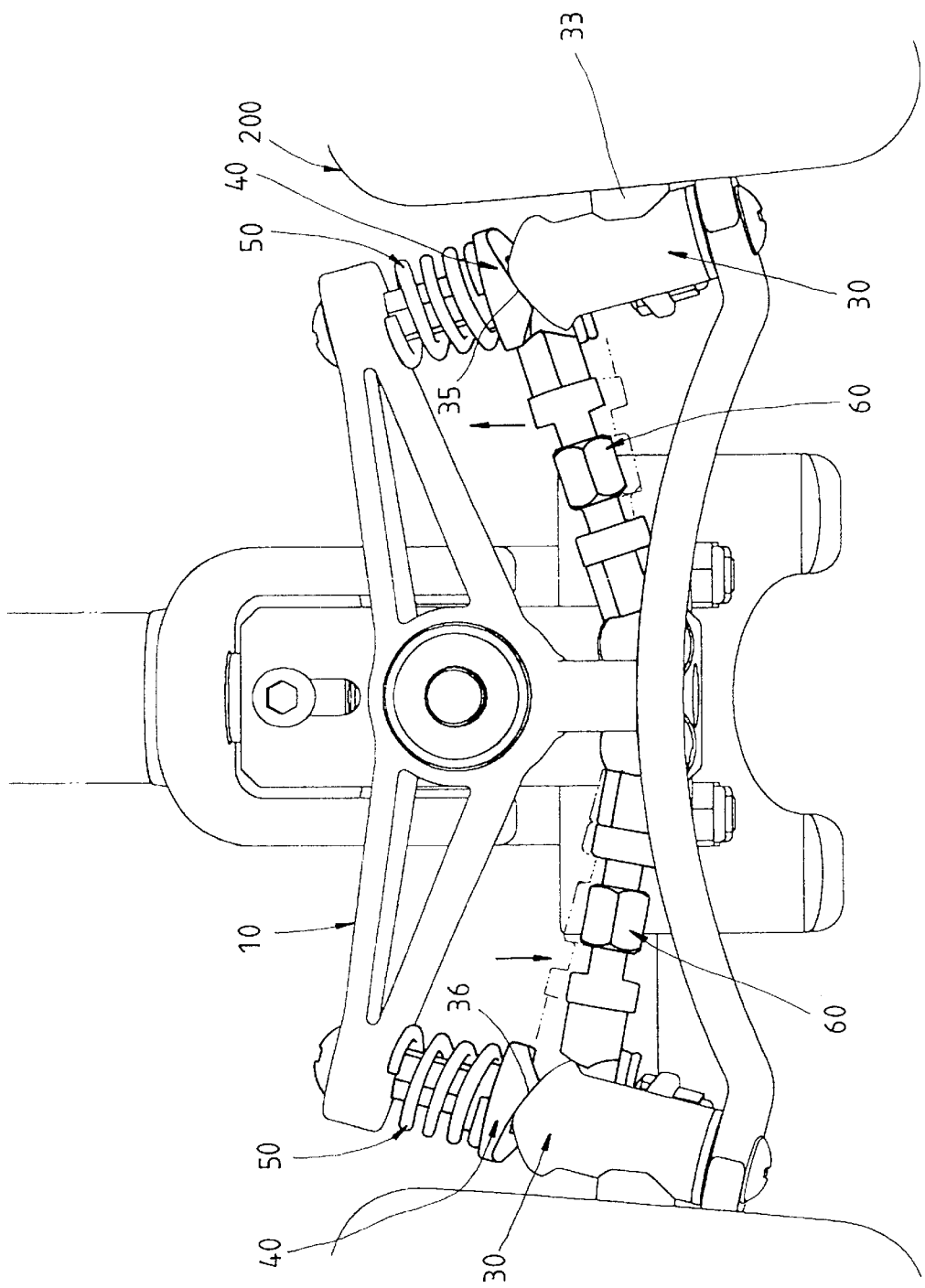
FIG. 7 is a front view of the present invention, showing the steering direction of the front wheels changed.
Figure 8:
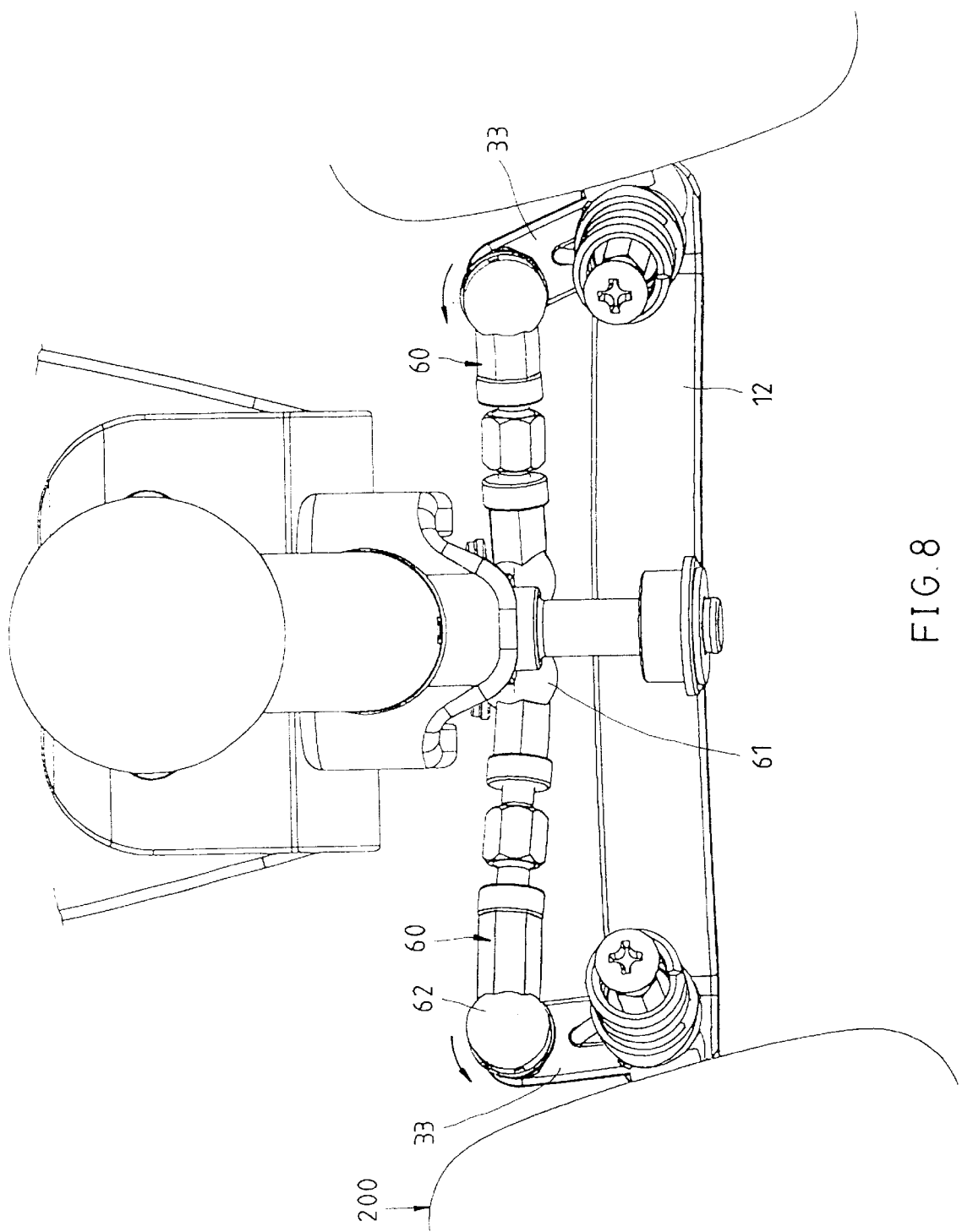
FIG. 8 is a top view, partially in section of FIG. 7.

The function and advantages of the present invention will become apparent from the following description. When the front wheels 200 are kept in the center positions, as shown in FIGS. 3 and 5, the second ball sockets 62 of the follower levers 60 are disposed at a higher elevation than the first ball sockets 61, the axle caps 40 are maintained in close contact with the toggle members 30, and the compression springs 50 receive no pressure. When the front wheels 200 are turned in one direction as shown in FIGS. 7 and 8, the toggle members 30 are moved with the front wheels, and the second arms 33 are turned with the toggle members 30 horizontally through an angle to force the follower levers 60 to turn vertically, and at the same time the raised portions 35 and 36 are moved with the toggle members 30 to push the axle caps 40 upwards along the respective guide rods 20 to compress the compression springs 50. When the turning force is released from the front wheels 200, the compression springs 50 immediately push the toggle members 30 to force the front wheels 200 back to the center position.

As indicated above, the bracket 10, the toggle members 30 and the follower levers 60 form a five-bar linkage, achieving a three-dimensional linking effect and preventing obstruction between parts. Therefore, the front wheels 200 can easily turned with less effort to change the steering direction of the kick scooter.

While only one embodiment of the present invention has been shown and described, it will be understood that various modifications and changes could be made thereunto without departing from the spirit and scope of the invention disclosed.

What the invention claimed is:

1. A kick scooter steering control mechanism installed in the footplate of a kick scooter having two front wheels and adapted to control the steering of the kick scooter, comprising:

- a bracket fixedly provided at the front side of the footplate of said kick scooter, said bracket comprising a top beam and a bottom beam;
- two toggle members respectively fastened to the front wheels of said kick scooter and pivoted to said bracket and disposed at two sides between said top beam and said bottom beam, said toggle members each comprising an arm, which is moved horizontally when the front wheels are turned through an angle;
- spring members respectively coupled between said toggle members and said top beam of said bracket to impart a downward pressure to said toggle members;
- two follower levers respectively coupled between the arms of said toggle members and the footplate of said kick scooter and movable vertically upon horizontal movement of the arms of said toggle members, said follower levers each having a first end coupled to the footplate of said kick scooter and a second end coupled to the arm of one of said toggle members.

2. The kick scooter steering control mechanism of claim 1, wherein the footplate of said kick scooter comprises two spherical connectors disposed at a front side thereof, and said follower levers each have a ball socket provided at the respective first end and coupled to one spherical connector of the footplate of said kick scooter.

3. The kick scooter steering control mechanism of claim 1, wherein the arms of each of said toggle member comprises a spherical connector disposed at one end, and said follower levers each have a ball socket provided at the respective second end and coupled to the spherical connector of the arm of one of said toggle members.

4. The kick scooter steering control mechanism of claim 1 further comprising two guide rods respectively inserted through said toggle members and said spring members and bilaterally connected between said top beam and said bottom beam.

5. The kick scooter steering control mechanism of claim 4, wherein said guide rods have a non-circular cross section and are respectively mounted with a respective axle cap respectively supported between said spring members and said toggle members, said axle cap having a non-circular axial hole fitting the non-circular cross section of the respective guide rod and an uneven bottom edge; said toggle members each have at least one raised portion respectively fitting the uneven bottom edge of the axle cap on each of said guide rods.

6. The kick scooter steering control mechanism of claim 1, wherein said spring members are compression springs.

* * * * *